(12) United States Patent
Li

(10) Patent No.: US 11,292,907 B2
(45) Date of Patent: Apr. 5, 2022

(54) POLYAMINOMETHYLBENZYLOXALAMIDES AND COMPOSITIONS AND METHODS RELATED THERETO

(71) Applicant: Plastipak Packaging, Inc., Plymouth, MI (US)

(72) Inventor: Shenshen Li, Park Ridge, IL (US)

(73) Assignee: PLASTIPAK PACKAGING INC, Plymouth, MI (US)

(*) Notice: Subject to any disclaimer, the term of this patent is extended or adjusted under 35 U.S.C. 154(b) by 341 days.

(21) Appl. No.: 14/943,999

(22) Filed: Nov. 17, 2015

(65) Prior Publication Data

US 2016/0137385 A1 May 19, 2016

Related U.S. Application Data

(60) Provisional application No. 62/081,547, filed on Nov. 18, 2014.

(51) Int. Cl.

| | |
|---|---|
| *B65D 81/26* | (2006.01) |
| *C08L 67/02* | (2006.01) |
| *C08G 69/26* | (2006.01) |
| *C08K 5/00* | (2006.01) |
| *C08L 77/06* | (2006.01) |

(52) U.S. Cl.
CPC .............. *C08L 67/02* (2013.01); *C08G 69/26* (2013.01); *C08K 5/0091* (2013.01); *C08L 77/06* (2013.01)

(58) Field of Classification Search
CPC ........ B65D 81/266; C08G 69/26; C08L 67/02
See application file for complete search history.

(56) References Cited

U.S. PATENT DOCUMENTS

| | | | |
|---|---|---|---|
| 2,916,475 A | 12/1959 | Caldwell | |
| 4,501,781 A | 2/1985 | Kushida et al. | |
| 5,021,515 A | 6/1991 | Cochran et al. | |
| 5,034,252 A * | 7/1991 | Nilsson ................ | B65D 1/0207 264/232 |
| 5,093,466 A * | 3/1992 | Patton ................ | C08G 69/265 428/474.4 |
| 5,159,005 A | 10/1992 | Frandsen et al. | |
| 5,391,640 A | 2/1995 | Akkapeddi et al. | |
| 5,955,527 A | 9/1999 | Cochran et al. | |
| 6,506,463 B1 | 1/2003 | Cahill et al. | |
| 7,288,586 B2 | 10/2007 | Stewart et al. | |
| 7,560,151 B2 | 7/2009 | Share et al. | |
| 7,641,950 B2 | 1/2010 | Stafford et al. | |
| 7,919,159 B2 | 4/2011 | Liu et al. | |
| 8,684,187 B2 | 4/2014 | Buschmann | |
| 9,637,594 B2 * | 5/2017 | Tochihara ............. | C08G 69/28 |
| 2006/0148957 A1 | 7/2006 | Stewart et al. | |
| 2012/0308751 A1 * | 12/2012 | Neill ....................... | B32B 27/08 428/36.7 |

FOREIGN PATENT DOCUMENTS

| | | | | |
|---|---|---|---|---|
| DE | 1808789 A1 * | 6/1970 | ............. | H01J 21/10 |
| EP | 1 655 238 A1 | 5/2006 | | |
| EP | 2098364 A1 | 9/2009 | | |
| EP | 2444458 A1 | 4/2012 | | |
| JP | 2009091532 A * | 4/2009 | ............... | C08K 3/00 |

OTHER PUBLICATIONS

International Search Report dated Mar. 4, 2016 for International Application No. PCT/US 15/61154, which was filed on Nov. 17, 2015 (Inventor—Li; Applicant—Plastipak Packaging, Inc., (pp. 1-4).
Written Opinion dated Mar. 4, 2016 for International Application No. PCT/US 15/61154, which was filed on Nov. 17, 2015 (Inventor—Li; Applicant—Plastipak Packaging, Inc., (pp. 1-5).
U.S. Appl. No. 62/081,547, filed Nov. 18, 2014, Shenshen Li (Plastipak Packaging, Inc.).
PCT, PCT/US15/61154, Nov. 17, 2015, Shenshen Li (Plastipak Packaging, Inc.).
Supplementary European Search Report and Written Opinion dated Apr. 25, 2018 by the European Patent Office for Patent Application No. 15861861.1, which was filed on Nov. 17, 2015 and published as EP 3221366 pn Sep. 27, 2017 (Inventor—Shenshen Li; Applicant—Plastipak Packaging, Inc.; (6 pages).
Examination Report dated Sep. 30, 2020 by the Australian Patent Office for AU Application No. 2020201163, which was filed on Nov. 17, 2015 (Inventor—Shenshen Li; Applicant—Plastipak Packaging, Inc.; (3 pages).

* cited by examiner

*Primary Examiner* — Bijan Ahvazi
(74) *Attorney, Agent, or Firm* — Ballard Spahr LLP

(57) ABSTRACT

The disclosure relates to oxygen scavenging polymers, compositions comprising the polymers, articles comprising the polymers and/or compositions, and methods of making the polymers, compositions, and/or articles. This abstract is intended as a scanning tool for purposes of searching in the particular art and is not intended to be limiting of the present invention.

13 Claims, 1 Drawing Sheet

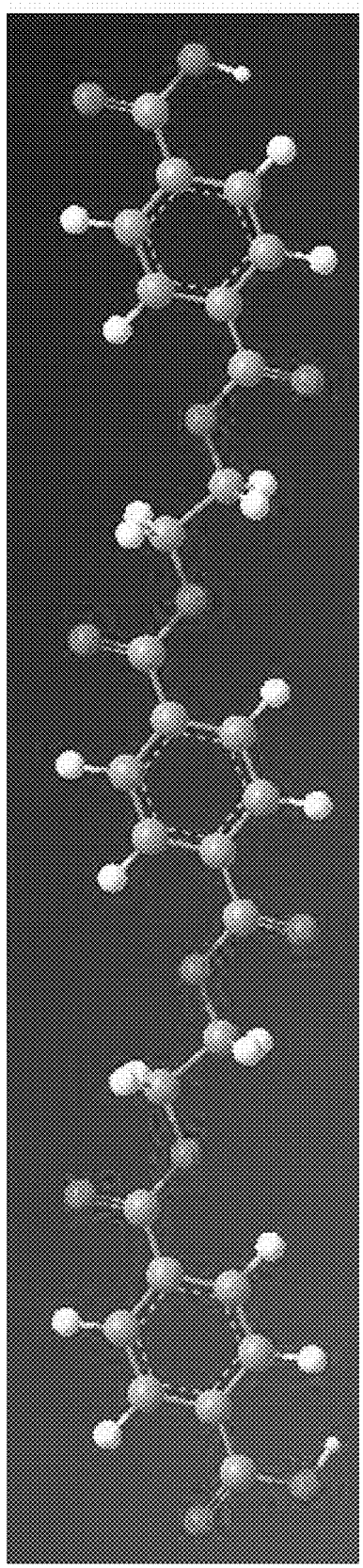

POLYAMINOMETHYLBENZYLOXALAMIDES AND COMPOSITIONS AND METHODS RELATED THERETO

CROSS-REFERENCE TO RELATED APPLICATIONS

This application claims the benefit of U.S. Provisional Application No. 62/081,547, filed on Nov. 18, 2014, which is incorporated herein fully by reference in its entirety.

BACKGROUND

Thermoplastic resins such as polyethylene terephthalate (PET) are commonly used to make a variety of different types of packaging materials and storage containers. PET produces high strength packaging articles and has found widespread use in applications for bottling substances such as soft drinks and water. However, because PET polymers are porous to gases such as oxygen, this has limited their use in bottling beer, fruit, and other substances susceptible to degradation by oxygen.

To address this limitation and improve shelf life for oxygen sensitive products (e.g., certain foods, beverages, and medicines), a number of strategies have been used. One of these is the use of a physical barrier. PET containers may contain multi-layer walls or one or more oxygen scavengers to prevent oxygen from reaching the contents of the container. In some instances, a passive oxygen barrier layer has been used in a polymer container to block oxygen transmission through the container wall. For example, in a multi-layer bottle, a barrier layer made from a substance that functions as a gas barrier such as ethylene vinyl alcohol (EVA), polyvinylidene dichloride (PVDC), or Nylon MXD6 may be combined with one or more layers of PET. In addition to the added complexity, multi-layer constructions may lead to delamination, or increased cost, and do not fully address the problem as these may allow oxygen already present in the container material to reach the contents of the container.

Another strategy is the use of an active oxygen scavenger to reduce or deplete oxygen in the environment of the oxygen-sensitive substance (whether through the environment or from the polymeric container itself). In some cases, an oxygen scavenger may be placed within a packet which is placed within the container so as to take up oxygen. However, these packets are generally limited to solid substances and solid foods as care must be taken so that the packet is not mistakenly used or ingested. In some instances, an active oxygen scavenger is incorporated into a polymer resin that forms one or more walls of a container. Examples include inorganic materials such as reduced metal powders or certain polymers. Reduced iron powder is commonly used for oxygen scavenging in food packages, where the iron reacts with oxygen and forms iron oxide. Polyamides or polyolefins may be incorporated into the backbone of a polymer forming container walls or used to make an oxygen absorbing layer in a multi-layer package walls.

Therefore, a need exists for polymers having improved oxygen scavenging capacity that maintain the desired aesthetic qualities (e.g., those that can be used in clear containers without producing undesired haze or coloring). These needs and other needs are satisfied by the present invention.

SUMMARY

In accordance with the purpose(s) of the invention, as embodied and broadly described herein, the invention, in one aspect, relates to oxygen scavenging polymers, compositions comprising the polymers, methods of making the polymers, and articles comprising the polymers and/or compositions.

Disclosed are oxygen scavenging composition comprising: (a) a polyamide, wherein the polyamide comprises at least one residue having a formula:

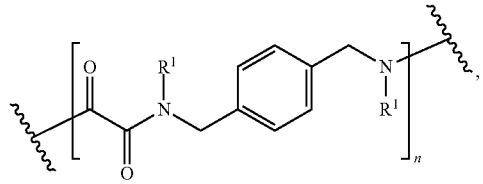

wherein n is greater than 5; wherein each $R^1$ is independently hydrogen, C1-C4 alkyl, $CH_2Ar^1$; or $Ar^1$; and wherein each $Ar^1$, when present, is aryl substituted with 0, 1, or 2 groups independently selected from halogen, —OH, —CN, —$N_3$, —$NH_2$, C1-C4 alkyl, C1-C4 alkoxy, C1-C4 monohaloalkyl, C1-C4 polyhaloalkyl, C1-C4 alkylamino, and C1-C4 dialkylamino; (b) polyethylene terephthalate; and (c) a transition metal in a positive oxidation state.

Also disclosed are polymers formed by the reaction of oxalic acid, oxalic halide, and/or oxalic ester with xylene diamine, wherein the oxalic acid, the oxalic halide, the oxalic ester, and/or the xylene diamine comprise at least about 50% of the polymer by mass.

Also disclosed are polymers comprising at least one residue having a structure represented by a formula:

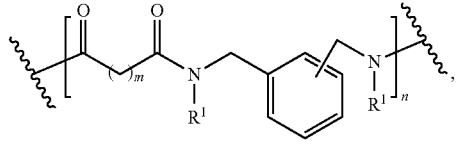

wherein n is greater than 5; wherein m is 0, 1, or 2; and wherein each $R^1$ is independently hydrogen, C1-C4 alkyl, $CH_2Ar^1$, or $Ar^1$; and wherein each $Ar^1$, when present, is aryl substituted with 0, 1, or 2 groups independently selected from halogen, —OH, —CN, —$N_3$, —$NH_2$, C1-C4 alkyl, C1-C4 alkoxy, C1-C4 monohaloalkyl, C1-C4 polyhaloalkyl, C1-C4 alkylamino, and C1-C4 dialkylamino.

Also disclosed are polymer blends comprising polyethylene terephthalate and a polyamide, wherein the polyamide comprises at least one residue having a structure represented by a formula:

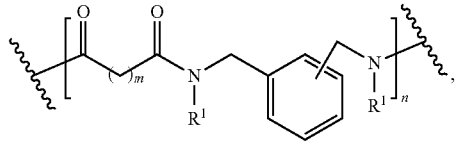

wherein n is greater than 5; wherein m is 0, 1, or 2; and wherein each $R^1$ is independently hydrogen, C1-C4 alkyl, $CH_2Ar^1$, or $Ar^1$; and wherein each $Ar^1$, when present, is aryl substituted with 0, 1, or 2 groups independently selected from halogen, —OH, —CN, —$N_3$, —$NH_2$, C1-C4 alkyl, C1-C4 alkoxy, C1-C4 monohaloalkyl, C1-C4 polyhaloalkyl, C1-C4 alkylamino, and C1-C4 dialkylamino.

Also disclosed are oxygen scavenging compositions comprising a polyamide, wherein the polyamide comprises at least one residue having a structure represented by a formula:

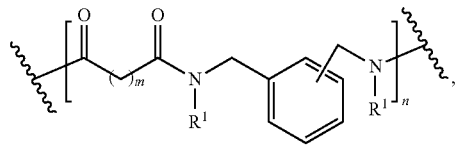

wherein n is greater than 5; wherein m is 0, 1, or 2; and wherein each $R^1$ is independently hydrogen, C1-C4 alkyl, $CH_2Ar^1$, or $Ar^1$; and wherein each $Ar^1$, when present, is aryl substituted with 0, 1, or 2 groups independently selected from halogen, —OH, —CN, —$N_3$, —$NH_2$, C1-C4 alkyl, C1-C4 alkoxy, C1-C4 monohaloalkyl, C1-C4 polyhaloalkyl, C1-C4 alkylamino, and C1-C4 dialkylamino.

Also disclosed are articles of manufacture comprising a polyamide, wherein the polyamide comprises at least one residue having a structure represented by a formula:

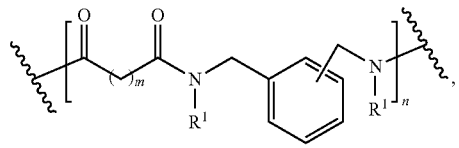

wherein n is greater than 5; wherein m is 0, 1, or 2; and wherein each $R^1$ is independently hydrogen, C1-C4 alkyl, $CH_2Ar^1$, or $Ar^1$; and wherein each $Ar^1$, when present, is aryl substituted with 0, 1, or 2 groups independently selected from halogen, —OH, —CN, —$N_3$, —$NH_2$, C1-C4 alkyl, C1-C4 alkoxy, C1-C4 monohaloalkyl, C1-C4 polyhaloalkyl, C1-C4 alkylamino, and C1-C4 dialkylamino.

Also disclosed are methods of making an oxygen scavenging polymer comprising the steps of: (a) providing a monomer comprising a moiety represented by a formula:

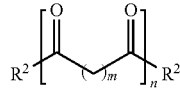

wherein n is greater than 5; wherein m is 0, 1, or 2; wherein each $R^2$ is independently —$OR^3$ or halide; and wherein each $R^3$, when present, is independently hydrogen or C1-C4 alkyl; and (b) reacting the monomer with a xylene diamine having a structure represented by a formula:

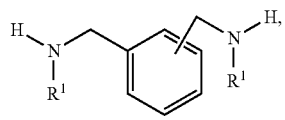

wherein each $R^1$ is independently hydrogen, C1-C4 alkyl, $CH_2Ar^1$, or $Ar^1$; and wherein each $Ar^1$, when present, is aryl substituted with 0, 1, or 2 groups independently selected from halogen, —OH, —CN, —$N_3$, —$NH_2$, C1-C4 alkyl, C1-C4 alkoxy, C1-C4 monohaloalkyl, C1-C4 polyhaloalkyl, C1-C4 alkylamino, and C1-C4 dialkylamino.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated in and constitute a part of this specification, illustrate several aspects and together with the description serve to explain the principles of the invention.

FIG. 1 shows a representative image of a polymer formed by the reaction of oxalic acid and para-xylene diamine.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

A. Definitions

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

All percentages, ratios and proportions herein are by weight, unless otherwise specified. All temperatures are in degrees Celsius (° C.) unless otherwise specified.

Throughout the description and claims of this specification the word "comprise" and other forms of the word, such as "comprising" and "comprises," means including but not limited to, and is not intended to exclude, for example, other additives, components, integers, or steps.

As used herein, the terms "optional" or "optionally" means that the subsequently described event or circumstance may or may not occur, and that the description includes instances where said event or circumstance occurs and instances where it does not.

As used herein, the term "substantially" means that the subsequently described event or circumstance completely occurs or that the subsequently described event or circumstance generally, typically, or approximately occurs. For example, when the specification discloses that substantially all of an agent is released, a person skilled in the relevant art would readily understand that the agent need not be completely released. Rather, this term conveys to a person skilled in the relevant art that the agent need only be released to an extent that an effective amount is no longer unreleased.

As used herein, the term "polymer" refers to a relatively high molecular weight organic compound, natural or synthetic, whose structure can be represented by a repeated small unit, the monomer (e.g., polyethylene, rubber, cellulose). Synthetic polymers are typically formed by addition or condensation polymerization of monomers.

As used herein, the term "copolymer" refers to a polymer formed from two or more different repeating units (monomer residues). By way of example and without limitation, a copolymer can be an alternating copolymer, a random copolymer, a block copolymer, or a graft copolymer. It is also contemplated that, in certain aspects, various block segments of a block copolymer can themselves comprise copolymers.

As used herein, the term "oligomer" refers to a relatively low molecular weight polymer in which the number of repeating units is between two and ten, for example, from two to eight, from two to six, or from two to four. In one aspect, a collection of oligomers can have an average number of repeating units of from about two to about ten, for example, from about two to about eight, from about two to about six, or from about two to about four.

As used herein, the term "molecular weight" (MW) refers to the mass of one molecule of that substance, relative to the unified atomic mass unit u (equal to $1/12$ the mass of one atom of carbon-12).

As used herein, the term "number average molecular weight" ($M_n$) refers to the common, mean, average of the molecular weights of the individual polymers. $M_n$ can be determined by measuring the molecular weight of n polymer molecules, summing the weights, and dividing by n. $M_n$ is calculated by:

$$\bar{M}_n = \frac{\Sigma_i N_i M_i}{\Sigma_i N_i},$$

wherein $N_i$ is the number of molecules of molecular weight $M_i$. The number average molecular weight of a polymer can be determined by gel permeation chromatography, viscometry (Mark-Houwink equation), light scattering, analytical ultracentrifugation, vapor pressure osmometry, end-group titration, and colligative properties.

As used herein, the term "weight average molecular weight" ($M_w$) refers to an alternative measure of the molecular weight of a polymer. $M_w$ is calculated by:

$$\bar{M}_w = \frac{\Sigma_i N_i M_i^2}{\Sigma_i N_i M_i},$$

wherein $N_i$ is the number of molecules of molecular weight $M_i$. Intuitively, if the weight average molecular weight is w, and a random monomer is selected, then the polymer it belongs to will have a weight of w on average. The weight average molecular weight can be determined by light scattering, small angle neutron scattering (SANS), X-ray scattering, and sedimentation velocity.

As used herein, the terms "polydispersity" and "polydispersity index" (PDI) refer to the ratio of the weight average to the number average ($M_w/M_n$).

As used herein, the term "compatibilizing agent" refers to a small molecule or polymer that has both polar and non-polar functional groups. For example, a fatty-acid ester has both polar and non-polar functional groups.

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— units in the polyester, regardless of whether ethylene glycol was used to prepare the polyester. Similarly, a sebacic acid residue in a polyester refers to one or more —OCH$_2$CH$_2$O— units in the polyester, regardless of whether the residue is obtained by reacting sebacic acid or an ester thereof to obtain the polyester.

A very close synonym of the term "residue" is the term "radical," which as used in the specification and concluding claims, refers to a fragment, group, or substructure of a molecule described herein, regardless of how the molecule is prepared. For example, a 2,4-thiazolidinedione radical in a particular compound has the structure:

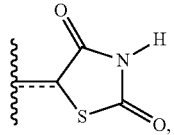

regardless of whether thiazolidinedione is used to prepare the compound. In some embodiments the radical (for example an alkyl) can be further modified (i.e., substituted alkyl) by having bonded thereto one or more "substituent radicals." The number of atoms in a given radical is not critical to the present invention unless it is indicated to the contrary elsewhere herein.

In some aspects, a structure of a compound can be represented by a formula:

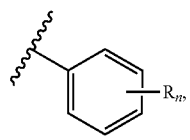

which is understood to be equivalent to a formula:

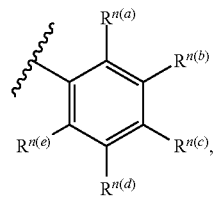

wherein n is typically an integer. That is, $R^n$ is understood to represent five independent substituents, $R^{n(a)}$, $R^{n(b)}$, $R^{n(c)}$, $R^{n(d)}$, $R^{n(e)}$. By "independent substituents," it is meant that each R substituent can be independently defined. For example, if in one instance $R^{n(a)}$ is halogen, then $R^{n(b)}$ is not necessarily halogen in that instance.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

In defining various terms, "A$^1$," "A$^2$," "A$^3$," and "A$^4$" are used herein as generic symbols to represent various specific substituents. These symbols can be any substituent, not limited to those disclosed herein, and when they are defined to be certain substituents in one instance, they can, in another instance, be defined as some other substituents.

The term "alkyl" as used herein is a branched or unbranched saturated hydrocarbon group of from 1 to 24 carbon atoms, for example from 1 to 12 carbons, from 1 to 8 carbons, from 1 to 6 carbons, or from 1 to 4 carbons, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including optionally substituted alkyl, cycloalkyl, alkoxy, amino, ether, halide, hydroxy, nitro, silyl, sulfo-oxo, or thiol, as described herein. A "lower alkyl" group is an alkyl group containing from one to six (e.g., from one to four) carbon atoms.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, norbornyl, and the like. The term "heterocycloalkyl" is a type of cycloalkyl group as defined above, and is included within the meaning of the term "cycloalkyl," where at least one of the carbon atoms of the ring is replaced with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including optionally substituted alkyl, cycloalkyl, alkoxy, amino, ether, halide, hydroxy, nitro, silyl, sulfo-oxo, or thiol as described herein.

The terms "alkoxy" and "alkoxyl" as used herein to refer to an alkyl or cycloalkyl group bonded through an ether linkage; that is, an "alkoxy" group can be defined as —$OA^1$ where $A^1$ is alkyl or cycloalkyl as defined above. "Alkoxy" also includes polymers of alkoxy groups as just described; that is, an alkoxy can be a polyether such as —$OA^1$-$OA^2$ or —$OA^1$-$(OA^2)_a$-$OA^3$, where "a" is an integer of from 1 to 200 and $A^1$, $A^2$, and $A^3$ are alkyl and/or cycloalkyl groups.

The term "alkenyl" as used herein is a hydrocarbon group of from 2 to 24 carbon atoms with a structural formula containing at least one carbon-carbon double bond. Asymmetric structures such as ($A^1$-$A^2$)C=C($A^3$-$A^4$) are intended to include both the E and Z isomers. This can be presumed in structural formulae herein wherein an asymmetric alkene is present, or it can be explicitly indicated by the bond symbol C=C. The alkenyl group can be substituted with one or more groups including optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkenyl" as used herein is a non-aromatic carbon-based ring composed of at least three carbon atoms and containing at least one carbon-carbon double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, norbornenyl, and the like. The term "heterocycloalkenyl" is a type of cycloalkenyl group as defined above, and is included within the meaning of the term "cycloalkenyl," where at least one of the carbon atoms of the ring is replaced with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "alkynyl" as used herein is a hydrocarbon group of 2 to 24 carbon atoms with a structural formula containing at least one carbon-carbon triple bond. The alkynyl group can be unsubstituted or substituted with one or more groups including optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkynyl" as used herein is a non-aromatic carbon-based ring composed of at least seven carbon atoms and containing at least one carbon-carbon triple bond. Examples of cycloalkynyl groups include, but are not limited to, cycloheptynyl, cyclooctynyl, cyclononynyl, and the like. The term "heterocycloalkynyl" is a type of cycloalkenyl group as defined above, and is included within the meaning of the term "cycloalkynyl," where at least one of the carbon atoms of the ring is replaced with a heteroatom such as, but not limited to, nitrogen, oxygen, sulfur, or phosphorus. The cycloalkynyl group and heterocycloalkynyl group can be substituted or unsubstituted. The cycloalkynyl group and heterocycloalkynyl group can be substituted with one or more groups including optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "aryl" as used herein is a group that contains any carbon-based aromatic group including benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein. The term "biaryl" is a specific type of aryl group and is included in the definition of "aryl." Biaryl refers to two aryl groups that are bound together via a fused ring structure, as in naphthalene, or are attached via one or more carbon-carbon bonds, as in biphenyl.

The term "aldehyde" as used herein is represented by the formula —C(O)H. Throughout this specification "C(O)" is a short hand notation for a carbonyl group, i.e., C=O.

The terms "amine" or "amino" as used herein are represented by the formula $NA^1$-$A^2$-$A^3$, where $A^1$, $A^2$, and $A^3$ can be, independently, hydrogen or optionally substituted alkyl, cycloalkyl, alkenyl, cycloalkenyl, alkynyl, cycloalkynyl, aryl, or heteroaryl group as described herein.

The term "carboxylic acid" as used herein is represented by the formula —C(O)OH.

The term "ester" as used herein is represented by the formula —OC(O)A$^1$ or —C(O)OA$^1$, where A$^1$ can be an optionally substituted alkyl, cycloalkyl, alkenyl, cycloalkenyl, alkynyl, cycloalkynyl, aryl, or heteroaryl group as described herein. The term "polyester" as used herein is represented by the formula -(A$^1$O(O)C-A$^2$-C(O)O)$_a$— or -(A$^1$O(O)C-A$^2$-OC(O))$_a$—, where A$^1$ and A$^2$ can be, independently, an optionally substituted alkyl, cycloalkyl, alkenyl, cycloalkenyl, alkynyl, cycloalkynyl, aryl, or heteroaryl group described herein and "a" is an integer from 1 to 500. "Polyester" is as the term used to describe a group that is produced by the reaction between a compound having at least two carboxylic acid groups with a compound having at least two hydroxyl groups.

The term "ether" as used herein is represented by the formula A$^1$OA$^2$, where A$^1$ and A$^2$ can be, independently, an optionally substituted alkyl, cycloalkyl, alkenyl, cycloalkenyl, alkynyl, cycloalkynyl, aryl, or heteroaryl group described herein. The term "polyether" as used herein is represented by the formula -(A$^1$O-A$^2$O)$_a$—, where A$^1$ and A$^2$ can be, independently, an optionally substituted alkyl, cycloalkyl, alkenyl, cycloalkenyl, alkynyl, cycloalkynyl, aryl, or heteroaryl group described herein and "a" is an integer of from 1 to 500. Examples of polyether groups include polyethylene oxide, polypropylene oxide, and polybutylene oxide.

The term "halide" as used herein refers to the halogens fluorine, chlorine, bromine, and iodine.

The term "heterocycle" as used herein refers to single and multi-cyclic aromatic or non-aromatic ring systems in which at least one of the ring members is other than carbon. Heterocycle includes pyridine, pyrimidine, furan, thiophene, pyrrole, isoxazole, isothiazole, pyrazole, oxazole, thiazole, imidazole, oxazole, including, 1,2,3-oxadiazole, 1,2,5-oxadiazole and 1,3,4-oxadiazole, thiadiazole, including, 1,2,3-thiadiazole, 1,2,5-thiadiazole, and 1,3,4-thiadiazole, triazole, including, 1,2,3-triazole, 1,3,4-triazole, tetrazole, including 1,2,3,4-tetrazole and 1,2,4,5-tetrazole, pyridine, pyridazine, pyrimidine, pyrazine, triazine, including 1,2,4-triazine and 1,3,5-triazine, tetrazine, including 1,2,4,5-tetrazine, pyrrolidine, piperidine, piperazine, morpholine, azetidine, tetrahydropyran, tetrahydrofuran, dioxane, and the like.

The term "hydroxyl" as used herein is represented by the formula —OH.

The term "ketone" as used herein is represented by the formula A$^1$C(O)A$^2$, where A$^1$ and A$^2$ can be, independently, an optionally substituted alkyl, cycloalkyl, alkenyl, cycloalkenyl, alkynyl, cycloalkynyl, aryl, or heteroaryl group as described herein.

The term "azide" as used herein is represented by the formula —N$_3$.

The term "nitro" as used herein is represented by the formula —NO$_2$.

The term "nitrile" as used herein is represented by the formula —CN.

The term "thiol" as used herein is represented by the formula —SH.

The terms "electron-withdrawing" or "electron-donating" as used herein refer to the ability of a substituent to withdraw or donate electrons relative to that of hydrogen, if hydrogen occupied the same position in the molecule. These terms are well-understood by one skilled in the art and are discussed, for example, in Advanced Organic Chemistry by J. March, 1985, pp. 16-18. Electron withdrawing groups can include fluoro, chloro, bromo, nitro, acyl, cyano, carboxyl, lower alkenyl, lower alkynyl, carboxaldehyde, carboxyamido, aryl, quaternary ammonium, trifluoro-methyl, alkoxycarbonyl, aryloxycarbonyl, aminocarbonyl, sulfonic, alkanesulfonyl, arylsulfonyl, perfluoroalkanesulfonyl, perfluoroarylsulfonyl, phosphoryl, tertiary amine cation and a combination thereof, among others. Electron donating groups can include such groups as hydroxy, lower alkoxy, lower alkyl, amino, lower alkylamino, di(lower alkyl)amino, aryloxy, mercapto, lower alkylthio, lower alkylmercapto and disulfide among others. One skilled in the art will appreciate that the aforesaid substituents may have electron donating or electron withdrawing properties under different chemical conditions.

Certain instances of the above defined terms may occur more than once in the structural formulae, and upon such occurrence each term shall be defined independently of the other.

As used herein, the term "effective amount" refers to an amount that is sufficient to achieve the desired result or to have an effect on an undesired condition. For example, a "visually effective amount" refers to an amount that is sufficient to achieve the desired result (i.e., impart color to a composition or an article), but is generally insufficient to cause adverse side affects (e.g., warping of a polymeric article).

As used herein, the term "leaving group" refers to an atom (or a group of atoms) with electron withdrawing ability that can be displaced as a stable species, taking with it the bonding electrons. Examples of suitable leaving groups include sulfonate esters, including triflate, mesylate, tosylate, brosylate, and halides.

Compounds described herein can contain one or more double bonds and, thus, potentially give rise to cis/trans (E/Z) isomers, as well as other conformational isomers. Unless stated to the contrary, the invention includes all such possible isomers, as well as mixtures of such isomers.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture. Compounds described herein can contain one or more asymmetric centers and, thus, potentially give rise to diastereomers and optical isomers. Unless stated to the contrary, the present invention includes all such possible diastereomers as well as their racemic mixtures, their substantially pure resolved enantiomers, all possible geometric isomers, and pharmaceutically acceptable salts thereof. Mixtures of stereoisomers, as well as isolated specific stereoisomers, are also included. During the course of the synthetic procedures used to prepare such compounds, or in using racemization or epimerization procedures known to those skilled in the art, the products of such procedures can be a mixture of stereoisomers.

B. Polymers

In one aspect, the invention relates to a polymer formed by the reaction of oxalic acid, oxalic halide, and/or oxalic ester with xylene diamine, wherein the oxalic acid, the oxalic halide, the oxalic ester, and/or the xylene diamine comprise at least about 50% of the polymer by mass.

In one aspect, the invention relates to a polymer comprising at least one residue having a structure represented by a formula:

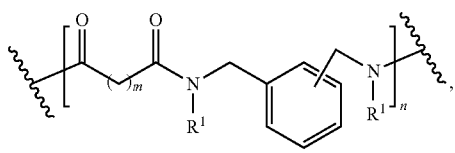

wherein n is greater than 5; wherein m is 0, 1, or 2; and wherein each $R^1$ is independently hydrogen, C1-C4 alkyl, $CH_2Ar^1$, or $Ar^1$, and wherein each $Ar^1$, when present, is aryl substituted with 0, 1, or 2 groups independently selected from halogen, —OH, —CN, —$N_3$, —$NH_2$, C1-C4 alkyl, C1-C4 alkoxy, C1-C4 monohaloalkyl, C1-C4 polyhaloalkyl, C1-C4 alkylamino, and C1-C4 dialkylamino.

In a further aspect, the polymer is formed by the reaction of oxalic acid with xylene diamine. In a still further aspect, the polymer is formed by the reaction of oxalic ester with xylene diamine. In yet a further aspect, the oxalic ester is selected from dimethyl oxalate and diethyl oxalate. In an even further aspect, the polymer is formed by the reaction of oxalic halide with xylene diamine. In a still further aspect, the oxalic halide is oxalic chloride.

In a further aspect, the polymer is formed by the reaction of a monomer comprising a moiety represented by a formula:

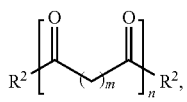

wherein n is greater than 5; wherein m is 0, 1, or 2; wherein each $R^2$ is independently —$OR^3$ or halide; and wherein each $R^3$, when present, is independently hydrogen or C1-C4 alkyl; with a xylene diamine having a structure represented by a formula:

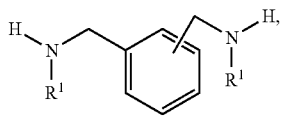

wherein each $R^1$ is independently hydrogen, C1-C4 alkyl, $CH_2Ar^1$, or $Ar^1$; and wherein each $Ar^1$, when present, is aryl substituted with 0, 1, or 2 groups independently selected from halogen, —OH, —CN, —$N_3$, —$NH_2$, C1-C4 alkyl, C1-C4 alkoxy, C1-C4 monohaloalkyl, C1-C4 polyhaloalkyl, C1-C4 alkylamino, and C1-C4 dialkylamino.

In various aspects, mixtures of two or more xylene diamines may be used to react with the oxalic acid, oxalic halide, and/or oxalic ester. It should be understood that the xylene diamine composition used to react with the oxalic acid, oxalic halide, and/or oxalic ester may not be 100% pure, and may contain reaction by-products with the identified diamine being the predominant compound in the composition, although a 100% pure composition can be included, as well.

In a further aspect, the oxalic acid, the oxalic halide, the oxalic ester, and/or the xylene diamine comprise at least about 10% of the polymer by mass. In a still further aspect, the oxalic acid, the oxalic halide, the oxalic ester, and/or the xylene diamine comprise at least about 20% of the polymer by mass. In yet a further aspect, the oxalic acid, the oxalic halide, the oxalic ester, and/or the xylene diamine comprise at least about 30% of the polymer by mass. In an even further aspect, the oxalic acid, the oxalic halide, the oxalic ester, and/or the xylene diamine comprise at least about 40% of the polymer by mass. In a still further aspect, the oxalic acid, the oxalic halide, the oxalic ester, and/or the xylene diamine comprise at least about 50% of the polymer by mass. In yet a further aspect, the oxalic acid, the oxalic halide, the oxalic ester, and/or the xylene diamine comprise at least about 60% of the polymer by mass. In an even further aspect, the oxalic acid, the oxalic halide, the oxalic ester, and/or the xylene diamine comprise at least about 70% of the polymer by mass. In a still further aspect, the oxalic acid, the oxalic halide, the oxalic ester, and/or the xylene diamine comprise at least about 80% of the polymer by mass. In yet a further aspect, the oxalic acid, the oxalic halide, the oxalic ester, and/or the xylene diamine comprise at least about 90% of the polymer by mass.

In a further aspect, the polymer comprises at least one residue having a structure represented by a formula selected from:

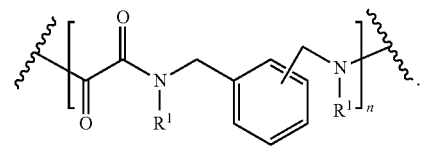

In a still further aspect, the polymer comprises at least one residue having a structure represented by a formula selected from:

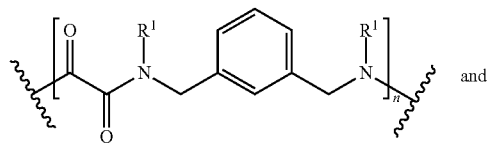 and

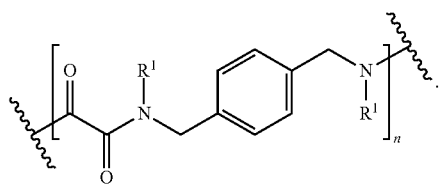

In yet a further aspect, the polymer comprises at least one residue having a structure represented by a formula:

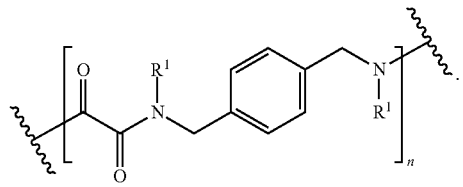

In a further aspect, the polymer comprises at least one residue having a structure represented by a formula:

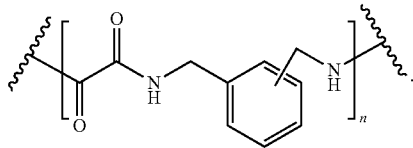

In a still further aspect, the polymer comprises at least one residue having a structure represented by a formula:

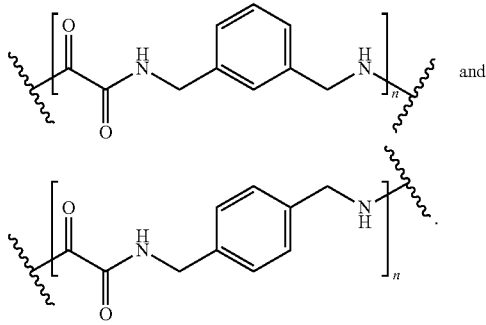

and

In yet a further aspect, the polymer comprises at least one residue having a structure represented by a formula:

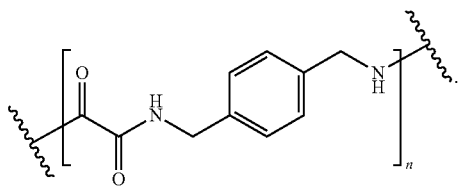

In a further aspect, m is 0, 1, or 2. In a still further aspect, m is 0 or 1. In yet a further aspect, m is 0 or 2. In an even further aspect, m is 1 or 2. In a still further aspect, m is 2. In yet a further aspect, m is 1. In an even further aspect, m is 0.

In a further aspect, n is greater than 5. In a still further aspect, n is greater than 10. In yet a further aspect, n is greater than 15. In an even further aspect, n is greater than 20. In a still further aspect, n is greater than 25. In yet a further aspect, n is greater than 30. In an even further aspect, n is greater than 35. In a still further aspect, n is greater than 40. In yet a further aspect, n is greater than 45. In an even further aspect, n is greater than 50.

1. $R^1$ GROUPS

In one aspect, each $R^1$ is independently hydrogen, C1-C4 alkyl, $CH_2Ar^1$, or $Ar^1$. In a further aspect, each $R^1$ is hydrogen. In a still further aspect, each $R^1$ is $CH_2Ar^1$ or $Ar^1$.

In a further aspect, each $R^1$ is independently methyl, ethyl, iso-propyl, n-propyl, iso-butyl, sec-butyl, tert-butyl, or n-butyl. In a still further aspect, each $R^1$ is independently methyl, ethyl, iso-propyl, and n-propyl. In yet a further aspect, each $R^1$ is independently methyl or ethyl.

In a further aspect, each $R^1$ is independently hydrogen or C1-C4 alkyl. In a still further aspect, each $R^1$ is independently hydrogen, methyl, ethyl, iso-propyl, or n-propyl. In yet a further aspect, each $R^1$ is independently hydrogen, methyl, or ethyl. In an even further aspect, each $R^1$ is independently hydrogen or methyl. In a still further aspect, each $R^1$ is ethyl. In yet a further aspect, each $R^1$ is methyl.

In a further aspect, each $R^1$ is independently hydrogen, $CH_2Ar^1$, or $Ar^1$. In a still further aspect, each $R^1$ is independently hydrogen or $CH_2Ar^1$. In yet a further aspect, each $R^1$ is independently hydrogen or $Ar^1$. In an even further aspect, each $R^1$ is $CH_2Ar^1$. In a still further aspect, each $R^1$ is $Ar^1$.

2. $R^2$ GROUPS

In one aspect, each $R^2$ is independently —$OR^3$ or halide. In a further aspect, each $R^2$ is —$OR^3$. In a still further aspect, each $R^2$ is halide.

In a further aspect, each $R^2$ is independently hydroxy, methoxy, ethoxy, i-propoxy, n-propoxy, i-butoxy, n-butoxy, s-butoxy, or t-butoxy. In a still further aspect, each $R^2$ is independently hydroxy, methoxy, ethoxy, i-propoxy, and n-propoxy. In yet a further aspect, each $R^2$ is independently hydroxy, methoxy, and ethoxy. In an even further aspect, each $R^2$ is ethoxy. In a still further aspect, each $R^2$ is methoxy. In yet a further aspect, each $R^2$ is hydroxy.

3. $R^3$ GROUPS

In one aspect, each $R^3$, when present, is independently hydrogen or C1-C4 alkyl. In a further aspect, each $R^3$, when present, is hydrogen. In a still further aspect, each $R^3$, when present, is C1-C4 alkyl.

In a further aspect, each $R^3$, when present, is independently methyl, ethyl, iso-propyl, n-propyl, iso-butyl, sec-butyl, tert-butyl, or n-butyl. In a still further aspect, each $R^3$, when present, is independently methyl, ethyl, iso-propyl, and n-propyl. In yet a further aspect, each $R^3$, when present, is independently methyl or ethyl.

In a further aspect, each $R^3$, when present, is independently hydrogen or C1-C4 alkyl. In a still further aspect, each $R^3$, when present, is independently hydrogen, methyl, ethyl, iso-propyl, or n-propyl. In yet a further aspect, each $R^3$, when present, is independently hydrogen, methyl, or ethyl. In an even further aspect, each $R^3$, when present, is independently hydrogen or methyl. In a still further aspect, each $R^3$, when present, is ethyl. In yet a further aspect, each $R^3$, when present, is methyl. In an even further aspect, each $R^3$, when present, is independently ethyl or methyl.

4. $Ar^1$ GROUPS

In one aspect, each $Ar^1$, when present, is aryl substituted with 0, 1, or 2 groups independently selected from halogen, —OH, —CN, —$N_3$, —$NH_2$, C1-C4 alkyl, C1-C4 alkoxy, C1-C4 monohaloalkyl, C1-C4 polyhaloalkyl, C1-C4 alkylamino, and C1-C4 dialkylamino. In a further aspect, each $Ar^1$, when present, is aryl substituted with 0 or 1 group independently selected from halogen, —OH, —CN, —$N_3$, —$NH_2$, C1-C4 alkyl, C1-C4 alkoxy, C1-C4 monohaloalkyl, C1-C4 polyhaloalkyl, C1-C4 alkylamino, and C1-C4 dialkylamino. In a still further aspect, each $Ar^1$, when present, is aryl monosubstituted with a group independently selected from halogen, —OH, —CN, —$N_3$, —$NH_2$, C1-C4 alkyl, C1-C4 alkoxy, C1-C4 monohaloalkyl, C1-C4 polyhaloalkyl, C1-C4 alkylamino, and C1-C4 dialkylamino. In yet a further aspect, each $Ar^1$, when present, is unsubstituted aryl.

In a further aspect, each $Ar^1$, when present, is phenyl substituted with 0, 1, or 2 groups independently selected from halogen, —OH, —CN, —$N_3$, —$NH_2$, C1-C4 alkyl, C1-C4 alkoxy, C1-C4 monohaloalkyl, C1-C4 polyhaloalkyl, C1-C4 alkylamino, and C1-C4 dialkylamino. In a still further aspect, each $Ar^1$, when present, is phenyl substituted with 0 or 1 group independently selected from halogen, —OH, —CN, —$N_3$, —$NH_2$, C1-C4 alkyl, C1-C4 alkoxy, C1-C4 monohaloalkyl, C1-C4 polyhaloalkyl, C1-C4 alkylamino, and C1-C4 dialkylamino. In yet a further aspect, each Ar¹, when present, is phenyl monosubstituted with a group independently selected from halogen, —OH, —CN, —N₃, —NH₂, C1-C4 alkyl, C1-C4 alkoxy, C1-C4 monohaloalkyl, C1-C4 polyhaloalkyl, C1-C4 alkylamino, and C1-C4 dialkylamino. In an even further aspect, each Ar¹, when present, is unsubstituted phenyl.

C. Polymer Blends

In one aspect, the invention relates to a polymer blend comprising polyethylene terephthalate and a polyamide, wherein the polyamide comprises at least one residue having a structure represented by a formula:

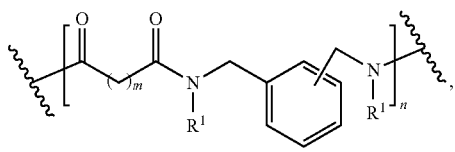

wherein n is greater than 5; wherein m is 0, 1, or 2; and wherein each R¹ is independently hydrogen, C1-C4 alkyl, CH₂Ar¹, or Ar¹; and wherein each Ar¹, when present, is aryl substituted with 0, 1, or 2 groups independently selected from halogen, —OH, —CN, —N₃, —NH₂, C1-C4 alkyl, C1-C4 alkoxy, C1-C4 monohaloalkyl, C1-C4 polyhaloalkyl, C1-C4 alkylamino, and C1-C4 dialkylamino.

In various aspects, the polymer blend may contain other types of oxygen scavenging polymers. For example, copolymers of α-olefins with polyamines and aromatic compounds (not polymers) having benzylic hydrogen atoms may be used.

The average molecular weight of the polyamide is not particularly limited to effectuate a measure of oxygen scavenging. Thus, in various aspects, the polyamide has a molecular weight of at least about 10,000. In a further aspect, the polyamide has a molecular weight of at least about 15,000. In a still further aspect, the polyamide has a molecular weight of at least about 20,000. In yet a further aspect, the polyamide has a molecular weight of at least about 25,000. In an even further aspect, the polyamide has a molecular weight of at least about 30,000. In a still further aspect, the polyamide has a molecular weight of at least about 35,000. In yet a further aspect, the polyamide has a molecular weight of at least about 40,000. In an even further aspect, the polyamide has a molecular weight of at least about 45,000.

In a further aspect, the polyamide comprises at least about 0.01 wt % of the polymer by mass. In a still further aspect, the polyamide comprises at least about 0.05 wt % of the polymer by mass. In yet a further aspect, the polyamide comprises at least about 0.1 wt % of the polymer by mass. In an even further aspect, the polyamide comprises at least about 0.5 wt % of the polymer by mass. In a still further aspect, the polyamide comprises at least about 1.0 wt % of the polymer by mass. In yet a further aspect, the polyamide comprises at least about 5.0 wt % of the polymer by mass. In an even further aspect, the polyamide comprises at least about 10 wt % of the polymer by mass. In a still further aspect, the polyamide comprises at least about 15 wt % of the polymer by mass. In yet a further aspect, the polyamide comprises at least about 20 wt % of the polymer by mass. In an even further aspect, In a further aspect, the polyethylene terephthalate comprises at least about 50 wt % of the polymer by mass. In a still further aspect, the polyethylene terephthalate comprises at least about 60 wt % of the polymer by mass. In yet a further aspect, the polyethylene terephthalate comprises at least about 70 wt % of the polymer by mass. In an even further aspect, the polyethylene terephthalate comprises at least about 80 wt % of the polymer by mass. In a still further aspect, the polyethylene terephthalate comprises at least about 90 wt % of the polymer by mass. In yet a further aspect, the polyethylene terephthalate comprises at least about 95 wt % of the polymer by mass. In an even further aspect, the polyethylene terephthalate comprises at least about 96 wt % of the polymer by mass. In a still further aspect, the polyethylene terephthalate comprises at least about 97 wt % of the polymer by mass. In yet a further aspect, the polyethylene terephthalate comprises at least about 98 wt % of the polymer by mass. In an even further aspect, the polyethylene terephthalate comprises at least about 99 wt % of the polymer by mass.

In a further aspect, the at least one residue has a structure represented by a formula selected from:

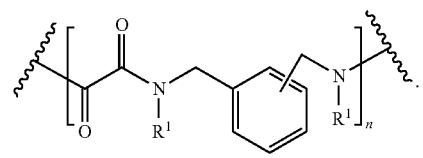

In a still further aspect, the at least one residue has a structure represented by a formula selected from:

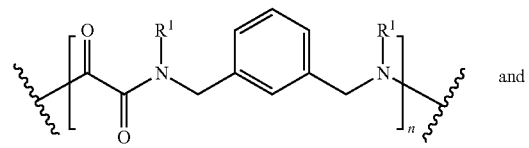

and

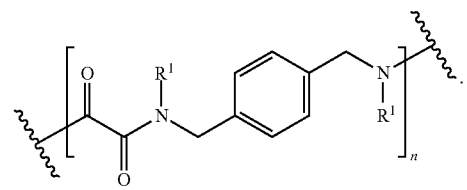

In yet a further aspect, the at least one residue has a structure represented by a formula selected from:

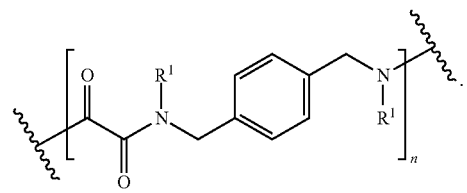

In a further aspect, the at least one residue has a structure represented by a formula selected from:

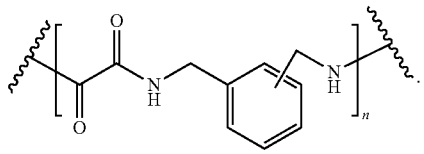

In a still further aspect, the at least one residue has a structure represented by a formula selected from:

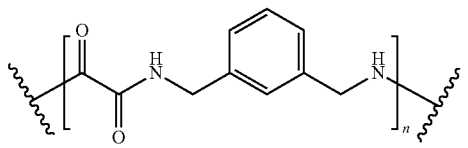

and

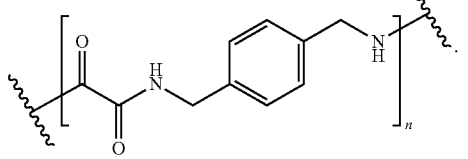

In yet a further aspect, the at least one residue has a structure represented by a formula selected from:

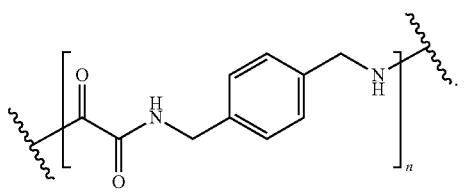

D. Oxygen Scavenging Compositions

In one aspect, the invention relates to an oxygen scavenging composition comprising: (a) a polyamide, wherein the polyamide comprises at least one residue having a formula:

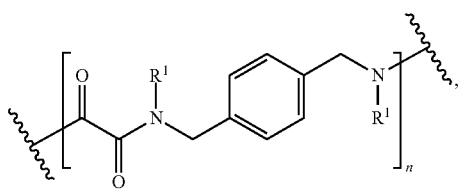

wherein n is greater than 5; wherein each $R^1$ is independently hydrogen, C1-C4 alkyl, $CH_2Ar^1$, or $Ar^1$; and wherein each $Ar^1$, when present, is aryl substituted with 0, 1, or 2 groups independently selected from halogen, —OH, —CN, —$N_3$, —$NH_2$, C1-C4 alkyl, C1-C4 alkoxy, C1-C4 monohaloalkyl, C1-C4 polyhaloalkyl, C1-C4 alkylamino, and C1-C4 dialkylamino; polyethylene terephthalate; and a transition metal in a positive oxidation state.

In one aspect, the invention relates to an oxygen scavenging composition comprising a polyamide, wherein the polyamide comprises at least one residue having a structure represented by a formula:

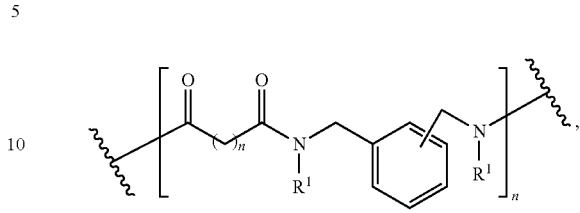

wherein n is greater than 5; wherein m is 0, 1, or 2; and wherein each $R^1$ is independently hydrogen, C1-C4 alkyl, $CH_2Ar^1$, or $Ar^1$; and wherein each $Ar^1$, when present, is aryl substituted with 0, 1, or 2 groups independently selected from halogen, —OH, —CN, —$N_3$, —$NH_2$, C1-C4 alkyl, C1-C4 alkoxy, C1-C4 monohaloalkyl, C1-C4 polyhaloalkyl, C1-C4 alkylamino, and C1-C4 dialkylamino.

In a further aspect, the at least one residue is present in an amount of about 0.01 wt % to about 99 wt % based on the weight of the composition. In a still further aspect, the at least one residue is present in an amount of about 0.01 wt % to about 75 wt % based on the weight of the composition. In yet a further aspect, the at least one residue is present in an amount of about 0.01 wt % to about 50 wt % based on the weight of the composition. In an even further aspect, the at least one residue is present in an amount of about 0.01 wt % to about 25 wt % based on the weight of the composition. In a still further aspect, the at least one residue is present in an amount of about 0.01 wt % to about 10 wt % based on the weight of the composition. In yet a further aspect, the at least one residue is present in an amount of about 1 wt % to about 10 wt % based on the weight of the composition. In an even further aspect, the at least one residue is present in an amount of about 10 wt % to about 99 wt % based on the weight of the composition. In a still further aspect, the at least one residue is present in an amount of about 25 wt % to about 99 wt % based on the weight of the composition. In yet a further aspect, the at least one residue is present in an amount of about 50 wt % to about 99 wt % based on the weight of the composition. In an even further aspect, the at least one residue is present in an amount of about 75 wt % to about 99 wt % based on the weight of the composition.

In various aspects, the disclosed compositions further comprise a base polymer. In a further aspect, the base polymer is polyethylene terephthalate (PET). PET, for example, can be prepared from terephthalic acid and ethylene glycol. PET can also be prepared, for example, from dimethyl terephthalate and ethylene glycol.

Various methods are known in the art for the preparation of PET including, but not limited to, esterification and polycondensation. Polyester melt phase manufacturing processes include direct condensation of a dicarboxylic acid with a diol, optionally in the presence of one or more esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and polymerization in the presence of a polycondensation catalyst.

Blends of different base polymers also can be used. Suitable base polymers include polyethylene, such as low density polyethylene, very low density polyethylene, ultralow density polyethylene, high density polyethylene, and linear low density polyethylene; polyesters such as PET, polyethylene naphthalate (PEN) and their copolymers such as polyethylene terephthalate isophthalate (PET/IP); polyvinyl chloride (PVC); polyvinylidene chloride (PVDC); and ethylene copolymers such as ethylene/vinyl acetate copolymer, ethylene/alkyl (meth)acrylate copolymers, ethylene/(meth)acrylic acid copolymers, and ionomers.

In a further aspect, the composition further comprises a transition metal in a positive oxidation state. In a further aspect, the transition metal may be a transition metal from the first, second, or third transition series of the Periodic Table. Thus, the metal may be Rh, Ru, or one of the elements in the series of Sc to Zn (e.g., Sc, Ti, V, Cr, Mn, Fe, Co, Ni, Cu, and Zn). Preferably, the state of the transition metal is in the +2 or +3 oxidation state.

In a further aspect, the transition metal is selected from cobalt and zinc. In a still further aspect, the transition metal is zinc. In yet a further aspect, the transition metal is cobalt. Zinc and cobalt are effective to activate or promote the oxidation of an oxidizable component, in this case the polyamide polymer. The mechanism by which these transition metals function to activate or promote the oxidation of the polyamide polymer is not certain. The transition metal may or may not be consumed in the oxidation reaction, or, if consumed, may only be consumed temporarily by converting back to a catalytically active state. It should be noted that a measure of the catalyst may be viewed as an initiator "generating free radicals which through branching chain reactions leads to the scavenging of oxygen out of proportion to the quantity of "catalyst"" (see U.S. Pat. No. 5,955,527).

In a further aspect, the transition metal may be present as a salt. The cation of the salt can be the transition metal in a positive oxidation state. A variety of anions can stabilize the positively charged transition metal. Suitable anions for the salts include, but are not limited to, chloride, acetate, oleate, stearate, palmitate, 2-ethylhexanoate, carboxylates, such as neodecanoates, octanoates, acetates, lactates, naphthalates, malates, stearates, acetylacetonates, linoleates, oleates, palmitates, 2-ethylhexanoates, or ethylene glycolates; or as their oxides, borates, carbonates, dioxides, hydroxides, nitrates, phosphates, sulfates, or silicates, among others. Representative transition metal salts include, but are not limited to, cobalt (II) 2-ethylhexanoate, cobalt oleate, and cobalt (II) neodecanoate. The transition metal salt may also be an ionomer, in which case a polymeric counter ion can be present.

The transition metal may enhance the oxygen scavenging properties of the oxygen scavenger compound. Thus, in various aspects, the transition metal is present in an amount of from about 10 ppm to about 400 ppm. In a further aspect, the transition metal is present in an amount of from about 10 ppm to about 350 ppm. In a still further aspect, the transition metal is present in an amount of from about 10 ppm to about 300 ppm. In yet a further aspect, the transition metal is present in an amount of from about 10 ppm to about 250 ppm. In an even further aspect, the transition metal is present in an amount of from about 10 ppm to about 200 ppm. In a still further aspect, the transition metal is present in an amount of from about 10 ppm to about 150 ppm. In yet a further aspect, the transition metal is present in an amount of from about 10 ppm to about 100 ppm. In an even further aspect, the transition metal is present in an amount of from about 10 ppm to about 50 ppm. In a still further aspect, the transition metal is present in an amount of from about 50 ppm to about 400 ppm. In yet a further aspect, the transition metal is present in an amount of from about 100 ppm to about 400 ppm. In an even further aspect, the transition metal is present in an amount of from about 150 ppm to about 400 ppm. In a still further aspect, the transition metal is present in an amount of from about 200 ppm to about 400 ppm. In yet a further aspect, the transition metal is present in an amount of from about 250 ppm to about 400 ppm. In an even further aspect, the transition metal is present in an amount of from about 300 ppm to about 400 ppm. In a still further aspect, the transition metal is present in an amount of from about 350 ppm to about 400 ppm.

In a further aspect, the composition further comprises a colorant in a visually effective amount. A visually effective amount refers to an amount of colorant that results in the composition or an article made therefrom appear colored to the naked eye. A visually effective amount can be determined, for example, by performing a spectrophotometric scan of the composition or article using a wavelength range from 400 to 700 nm (visible region). Specific colors can be characterized according to their spectral pattern. Every color also has its own characteristic L (lightness gradation), a (red to green) and b (yellow to blue) numbers, which can be used to characterize the compositions and articles.

The colorant can be a variety of pigments and dyes, many of which are commercially available. Suitable colorants include, but are not limited to, COLORMATRIX Dark Amber, product code: 189-10034-6, COLORMATRIX Dead Leaf Green, product codes: 284-2801-3 and 84-2801-1, AMERICHEM amber, product code: 59108-CD1, Champaigne green, and COLORMATRIX amber, product code: 189-10100-1.

In a further aspect, the colorant is present in an amount of at least 0.01 wt %. In a still further aspect, the colorant is present in an amount of at least 0.1 wt %. In yet a further aspect, the colorant is present in an amount of at least 0.25 wt %. In an even further aspect, the colorant is present in an amount of at least 0.5 wt %.

In a further aspect, the composition further comprises a reheat additive. Reheat additives are commonly used in the manufacture of polyester polymer compositions used to make stretch blow molded bottles because the preforms made from the composition must be reheated prior to entering the mold for stretch blowing into a bottle. Suitable reheat additives include, for example, various forms of black particles, e.g., carbon black, activated carbon, black iron oxide, glassy carbon, silicon carbide, gray particles such as antimony, silicas, red iron oxide, and the like.

In a further aspect, the reheat additive is present in an amount of at least 0.01 wt %. In a still further aspect, the reheat additive is present in an amount of at least 0.1 wt %. In yet a further aspect, the reheat additive is present in an amount of at least 0.25 wt %. In an even further aspect, the reheat additive is present in an amount of at least 0.5 wt %.

In a further aspect, the composition further comprises an impact modifier. Suitable impact modifiers include, but are not limited to, ethylene/acrylate/glycidyl terpolymers and ethylene/acrylate copolymers in which the acrylate is a methyl or ethyl acrylate or methyl or ethyl methacrylate or the corresponding butyl acrylates, styrene based block copolymers, and various acrylic core/shell type impact modifiers.

In a further aspect, the impact modifier is present in an amount of at least 0.01 wt. %. In a still further aspect, the impact modifier is present in an amount of at least 0.1 wt %. In yet a further aspect, the impact modifier is present in an amount of at least 0.25 wt %. In an even further aspect, the impact modifier is present in an amount of at least 0.5 wt %.

In various aspects, the composition may further comprise other additives. Suitable additives include, but are not limited to, harmonizers, compatibilizers, fillers, crystallization aids, impact modifiers, surface lubricants, denesting agents, stabilizers, ultraviolet light absorbing agents, metal deactivators, nucleating agents such as polyethylene and polypropylene, phosphate stabilizers and dyestuffs.

In a further aspect, the other additive is present in an amount of at least about 0.01 wt %. In a still further aspect, the other additive is present in an amount of at least about 0.1 wt %. In yet a further aspect, the other additive is present in an amount of at least about 0.25 wt %. In an even further aspect, the other additive is present in an amount of at least about 0.5 wt %.

In many applications, not only are the packaging contents sensitive to the ingress of oxygen, but the contents may also be affected by UV light. Fruit juices and pharmaceuticals are two examples of such contents. Accordingly, in some aspects, it is desirable to incorporate into the composition a UV absorbing compound in an amount effective to protect the packaged contents.

In a further aspect, the disclosed composition or an article made therefrom can have an Oxygen Transmission Rate (OTR) of less than about 0.1 (units of cc/pkg/day or 1-5 cc-mm/m$^2$-day-atm) under standard conditions. In a further aspect, the OTR can be less than 0.03, less than 0.01, less than 0.005, or less than 0.001. The OTR is a measure of how well the oxygen scavenger compound functions at scavenging oxygen that permeates the composition or article.

When OTR is expressed for a given composition or article, the units "cc/package/day" ("cc/pkg/day") are typically employed. The term package refers to a barrier between an atmosphere of relatively lower oxygen content and an atmosphere of relatively higher oxygen content. Typical barriers (e.g., packages) include bottles, thermoformed containers, and films (e.g., shrink wrap).

Oxygen Transmission Rate (oxygen permeation) can be measured, for example, as described in U.S. Pat. No. 5,021,515. A material of area A can be exposed to a partial pressure p of oxygen on the one side and to an essentially zero partial pressure of oxygen on the other side. The quantity of oxygen emerging on the latter side is measured and expressed as a volume rate dV/dt, the volume being converted to some standard condition of temperature and pressure. After a certain time of exposure (usually a period of a few days) dV/dt is generally found to stabilize, and a $P_w$ value can be calculated from equation below:

$$dV/dt = P_w A p \quad (1)$$

$P_w$ refers to the permeance of the wall. (Analogy with magnetic permeance and electrical conductance would suggest that $P_w$ should be described as "permeance per unit area", but we are following the nomenclature in Encyclopedia of Polymer Science and Technology, Vol. 2, Wiley Interscience, 1985, page 178.) The standard conditions for expressing dV/dt are 0° C. and 1 atm (1 atm=101 325 Nm$^{-2}$). If the thickness of the area of wall is substantially constant over the area A with value T and the wall is uniform through the thickness (i.e., the wall is not a laminated or coated one) then the permeability of the material in the direction normal to the wall is calculated from the equation below:

$$dV/dt = P_M A p / T \quad (2)$$

For non-scavenging materials, $P_w$ and $P_M$ are to a reasonable approximation independent of t and p, and $P_M$ of T although they are often appreciably dependent on other conditions of the measurement such as the humidity of the atmosphere on the oxygen-rich side and the temperature of the measurement.

For oxygen-scavenging walls, $P_w$ and $P_M$ are functions of t because the concentrations and activity of scavenger vary with time (particularly as the scavenger is consumed). This typically does not prevent measurement of $P_w$ and $P_M$ reasonably accurately as a function of time, because the changes in dV/dt are relatively gradual once the normal initial equilibration period of a few days is over. After a few days' exposure to the measurement conditions, however, a non-scavenging material typically achieves a steady state in which dV/dt is equal to the rate of oxygen ingress to the wall, while a scavenging material achieves an (almost) steady state in which dV/dt is considerably less than the rate of oxygen ingress to the material. This being the case, it is likely that $P_w$ calculated from (1) is a function of p as well as of t and that $P_M$ in (2) is a function of p and T as well as of t. $P_w$ and $P_M$ for scavenging materials are, strictly speaking, not true permeances and permeabilities at all (since permeation and scavenging are occurring simultaneously) but, rather, apparent ones.

Values of $P_w$ and $P_M$ (except where stated otherwise) are to be understood to refer to conditions in which p=0.21 atm, the relative humidity on the oxygen-rich side of the wall is 50%, the temperature is 23° C. and (in the case of $P_M$ values) the thickness of the material of about 0.45 mm. Conditions close to the first three of these, at least, are conventional in the packaging industry.

For example, OTR can be measured for bottles, for example, by controlling the atmosphere on both sides of a sample of bottles and measuring the rate of oxygen permeation over time. Typically, the bottles are mounted on a plate such that there are two ports for gas inlet and outlet. The interior of the bottles is separated from the exterior by an air tight seal. After sealing, the interior of the bottle is flushed with $N_2$ gas (or $N_2+H_2$ mixture) to remove any oxygen present before mounting on plate. The bottle is then placed in a controlled environmental chamber (maintained at 23° C. and 50% RH) such that the exterior of the bottle is at standard atmosphere with ~21% oxygen. The interior of the bottle is continuously flushed with $N_2$ (or $N_2+H_2$) at a known gas flow rate. The outlet of the flushed gases contains oxygen permeating through the bottle wall. This flushed gas from the bottle interior is passed over a sensor that is calibrated to measure oxygen content of the flushed gas. Such measurements of oxygen content are made continuously over time until a steady state is reached. This steady state value is typically reported as Oxygen Transmission Rate (OTR) for that bottle in the units of cc/package/day. A preferred OTR for PET bottles is less than 0.1 cc/package/day; more preferred is less than 0.01 cc/package/day; most preferred for PET bottles is less than 0.001 cc/package/day over the shelf life of the packaged product.

In various aspects, the oxygen scavenging composition has an OTR of less than that of an otherwise identical composition in the absence of the polyamide and the transition metal. In a further aspect, the oxygen scavenging composition has an OTR of less than about 75% of an otherwise identical composition in the absence of the polyamide and the transition metal. In a still further aspect, the oxygen scavenging composition has an OTR of less than about 50% of an otherwise identical composition in the absence of the polyamide and the transition metal. In yet a further aspect, the oxygen scavenging composition has an OTR of less than about 25% of an otherwise identical composition in the absence of the polyamide and the transition metal. In an even further aspect, the oxygen scavenging composition has an OTR of less than about 20% of an otherwise identical composition in the absence of the polyamide and the transition metal. In a still further aspect, the oxygen scavenging composition has an OTR of less than about 10% of an otherwise identical composition in the absence of the polyamide and the transition metal. In yet a further aspect, the oxygen scavenging composition has an OTR of less than about 5% of an otherwise identical composition in the absence of the polyamide and the transition metal. In an even further aspect, the oxygen scavenging composition has an OTR of less than about 1% of an otherwise identical composition in the absence of the polyamide and the transition metal.

In a further aspect, the polyamide is formed by the reaction of oxalic acid, oxalic halide, and/or oxalic ester, and xylene diamine. In a still further aspect, the polyamide is formed by the reaction of oxalic acid and xylene diamine. In yet a further aspect, the polymer is formed by the reaction of oxalic ester and xylene diamine. In an even further aspect, the oxalic ester is selected from dimethyl oxalate and diethyl oxalate. In a still further aspect, the polyamide is formed by the reaction of oxalic halide and xylene diamine. In a still further aspect, the oxalic halide is oxalic chloride.

In a further aspect, the polyamide comprises at least one oxalic acid residue, oxalic halide residue, and/or oxalic ester residue.

In a further aspect, the oxalic acid residue, oxalic halide residue, and/or oxalic ester residue comprises at least 10 molar % of the diacid residue. In a still further aspect, the oxalic acid residue, oxalic halide residue, and/or oxalic ester residue comprises at least 20 mol % of the diacid residue. In yet a further aspect, the oxalic acid residue, oxalic halide residue, and/or oxalic ester residue comprises at least 30 mol % of the diacid residue. In an even further aspect, the oxalic acid residue, oxalic halide residue, and/or oxalic ester residue comprises at least 40 mol % of the diacid residue. In a still further aspect, the oxalic acid residue, oxalic halide residue, and/or oxalic ester residue comprises at least 50 mol % of the diacid residue. In yet a further aspect, the oxalic acid residue, oxalic halide residue, and/or oxalic ester residue comprises at least 60 mol % of the diacid residue. In an even further aspect, the oxalic acid residue, oxalic halide residue, and/or oxalic ester residue comprises at least 70 mol % of the diacid residue. In a still further aspect, the oxalic acid residue, oxalic halide residue, and/or oxalic ester residue comprises at least 80 mol % of the diacid residue. In yet a further aspect, the oxalic acid residue, oxalic halide residue, and/or oxalic ester residue comprises at least 90 mol % of the diacid residue.

In a further aspect, the oxalic acid residue, oxalic halide residue, and/or oxalic ester residue comprises at least 91 mol % of the diacid residue. In a still further aspect, the oxalic acid residue, oxalic halide residue, and/or oxalic ester residue comprises at least 92 mol % of the diacid residue. In yet a further aspect, the oxalic acid residue, oxalic halide residue, and/or oxalic ester residue comprises at least 93 mol % of the diacid residue. In an even further aspect, the oxalic acid residue, oxalic halide residue, and/or oxalic ester residue comprises at least 94 mol % of the diacid residue. In a still further aspect, the oxalic acid residue, oxalic halide residue, and/or oxalic ester residue comprises at least 95 mol % of the diacid residue. In yet a further aspect, the oxalic acid residue, oxalic halide residue, and/or oxalic ester residue comprises at least 96 mol % of the diacid residue. In an even further aspect, the oxalic acid residue, oxalic halide residue, and/or oxalic ester residue comprises at least 97 mol % of the diacid residue. In a still further aspect, the oxalic acid residue, oxalic halide residue, and/or oxalic ester residue comprises at least 98 mol % of the diacid residue. In yet a further aspect, the oxalic acid residue, oxalic halide residue, and/or oxalic ester residue comprises at least 99 mol % of the diacid residue.

In a further aspect, the polyamide has a molecular weight of at least about 1,000. In a still further aspect, the polyamide has a molecular weight of at least about 5,000. In yet a further aspect, the polyamide has a molecular weight of at least about 10,000. In an even further aspect, the polyamide has a molecular weight of at least about 15,000. In a still further aspect, the polyamide has a molecular weight of at least about 25,000. In yet a further aspect, the polyamide has a molecular weight of at least about 35,000. In an even further aspect, the polyamide has a molecular weight of at least about 45,000. In a still further aspect, the polyamide has a molecular weight of at least about 55,000. In yet a further aspect, the polyamide has a molecular weight of at least about 65,000. In an even further aspect, the polyamide has a molecular weight of at least about 75,000. In a still further aspect, the polyamide has a molecular weight of at least about 85,000. In yet a further aspect, the polyamide has a molecular weight of at least about 95,000.

In a further aspect, the polyamide is present in an amount of from about 0.01 wt % to about 10 wt % based on the weight of the composition. In a still further aspect, the polyamide is present in an amount of from about 0.05 wt % to about 10 wt % based on the weight of the composition. In yet a further aspect, the polyamide is present in an amount of from about 0.1 wt % to about 10 wt % based on the weight of the composition. In an even further aspect, the polyamide is present in an amount of from about 0.5 wt % to about 10 wt % based on the weight of the composition. In a still further aspect, the polyamide is present in an amount of from about 1.0 wt % to about 10 wt % based on the weight of the composition. In yet a further aspect, the polyamide is present in an amount of from about 5.0 wt % to about 10 wt % based on the weight of the composition. In an even further aspect, the polyamide is present in an amount of from about 0.5 wt % to about 25 wt % based on the weight of the composition. In a still further aspect, the polyamide is present in an amount of from about 0.5 wt % to about 20 wt % based on the weight of the composition. In yet a further aspect, the polyamide is present in an amount of from about 0.5 wt % to about 10 wt % based on the weight of the composition. In an even further aspect, the polyamide is present in an amount of from about 0.5 wt % to about 5.0 wt % based on the weight of the composition. In a still further aspect, the polyamide is present in an amount of from about 0.5 wt % to about 1.0 wt % based on the weight of the composition.

In a further aspect, each $R^1$ is independently hydrogen or C1-C4 alkyl.

In a further aspect, the at least one residue has a structure represented by a formula selected from:

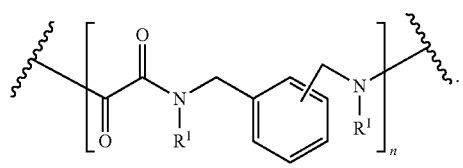

In a still further aspect, the at least one residue has a structure represented by a formula selected from:

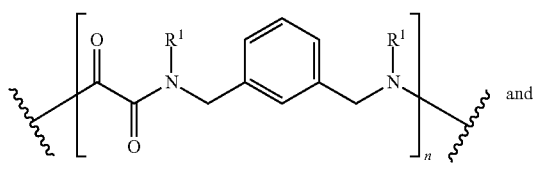
and

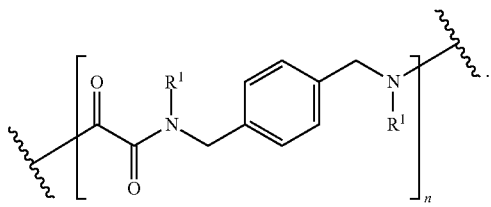

In yet a further aspect, the at least one residue has a structure represented by a formula selected from:

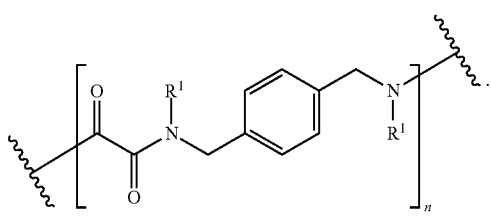

In a further aspect, the at least one residue has a structure represented by a formula selected from:

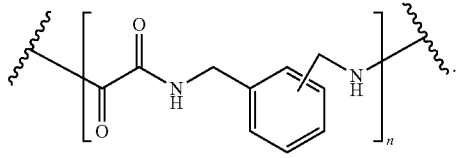

In a still further aspect, the at least one residue has a structure represented by a formula selected from:

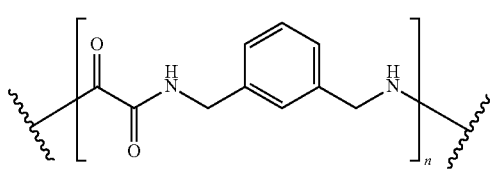
and

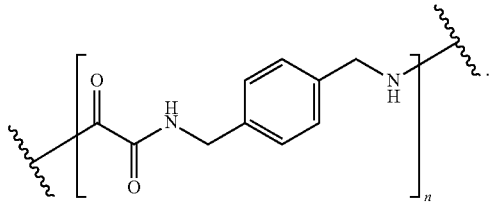

In yet a further aspect, the at least one residue has a structure represented by a formula selected from:

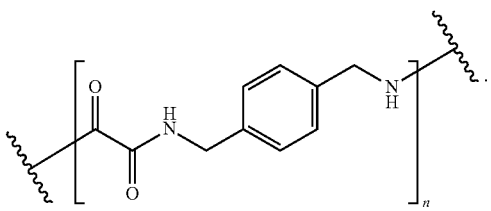

E. Methods for Making Oxygen Scavenging Polymers

In one aspect, the invention relates to methods of making an oxygen scavenging polymer comprising the steps of: (a) providing a monomer comprising a moiety represented by a formula:

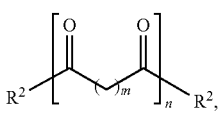

wherein n is greater than 5; wherein m is 0, 1, or 2; wherein each $R^2$ is independently —$OR^3$ or halide; and wherein each $R^3$, when present, is independently hydrogen or C1-C4 alkyl; and (b) reacting the monomer with a xylene diamine having a structure represented by a formula:

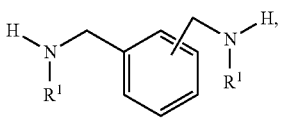

wherein each $R^1$ is independently hydrogen, C1-C4 alkyl, $CH_2Ar^1$, or $Ar^1$; and wherein each $Ar^1$, when present, is aryl substituted with 0, 1, or 2 groups independently selected from halogen, —OH, —CN, —$N_3$, —$NH_2$, C1-C4 alkyl, C1-C4 alkoxy, C1-C4 monohaloalkyl, C1-C4 polyhaloalkyl, C1-C4 alkylamino, and C1-C4 dialkylamino.

In a further aspect, reacting is in the absence of a catalyst. In a still further aspect, reacting is in the presence of a catalyst. Examples of catalysts include, but are not limited, to metal oxides (e.g., activated alumina), metal salts (e.g., zirconium chloride), metal compounds (e.g., metallocene), and boric- and boronic acid-based catalysts.

In a further aspect, each $R^2$ is -$OR^3$. In a still further aspect, each $R^2$ is halide.

In a further aspect, each $R^3$, when present, is hydrogen. In a still further aspect, each $R^3$, when present, is C1-C4 alkyl. In yet a further aspect, each $R^3$, when present, is independently ethyl or methyl.

In a further aspect, the monomer comprises a moiety represented by a formula:

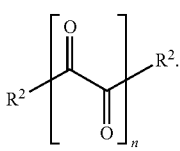

In a still further aspect, the monomer comprises a moiety represented by a formula:

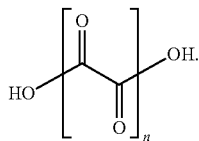

In a further aspect, the xylene diamine has a structure represented by a formula:

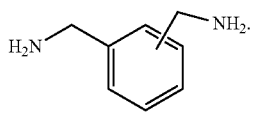

In a further aspect, the xylene diamine has a structure selected from:

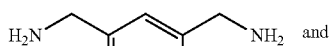 and

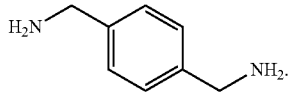

In a further aspect, the xylene diamine has a structure:

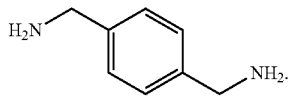

In a further aspect, the oxygen scavenging polymer comprises at least one residue having a structure represented by a formula:

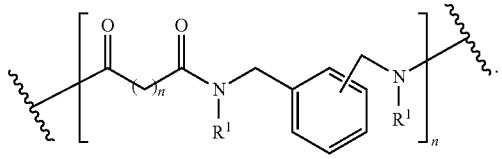

F. Methods for Making Oxygen Scavenging Compositions

In one aspect, the invention relates to methods for making oxygen scavenging compositions. Various methods exist for making the disclosed compositions. For example, the composition can be made by mixing the polyethylene terephthalate with the polyamide and optionally, the transition metal. In various aspects, some or part of the transition metal may already be present in the polyethylene terephthalate prior to mixing, for example, if the transition metal is used as a catalyst for making the polyethylene terephthalate. In a further aspect, the polyethylene terephthalate, the polyamide, and the transition metal are mixed by tumbling in a hopper. Other optional ingredients can be added during this mixing process or added to the mixture after the aforementioned mixing or to an individual component prior to the aforementioned mixing step.

When melt processing is desired for the composition, the composition can also be made by adding each ingredient separately and mixing the ingredients just prior to melt processing the composition to form an article. In some embodiments, the mixing can be just prior to the melt process zone. In other embodiments, one or more ingredients can be premixed in a separate step prior to bringing all of the ingredients together.

In some aspects, the transition metal can be added neat or in a carrier (such as a liquid or wax) to an extruder or other device for making the article, or the metal can be present in a concentrate or carrier with the polyamide, in a concentrate or carrier with the polyethylene terephthalate, or in a concentrate or carrier with a polyethylene terephthalate/polyamide blend. It is desirable that the addition of the transition metal does not substantially increase the intrinsic viscosity of the melt in the melt processing zone. Thus, transition metal or metals can be added in two or more stages, such as once during the melt phase for the production of the polyethylene terephthalate and again once more to the melting zone for making the article.

The melt blend of polyethylene terephthalate, the polyamide, and the transition metal can also be prepared by adding the components at the throat of an injection molding machine that: (i) produces a preform that can be stretch blow molded into the shape of the container, (ii) produces a film that can be oriented into a packaging film, (iii) produces a sheet that can be thermoformed into a food tray, or (iv) produces an injection molded container. The mixing section of the extruder should be of a design to produce a homogeneous blend. Such process steps work well for forming carbonated soft drink, water or beer bottles, packaging films, and thermoformed trays. The present invention can be employed in any of the conventional known processes for producing a polymeric container, film, tray, or other article that would benefit from oxygen scavenging.

G. Articles

In one aspect, the invention relates to an article of manufacture comprising a polyamide, wherein the polyamide comprises at least one residue having a structure represented by a formula:

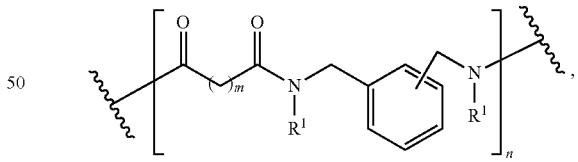

wherein n is greater than 5; wherein m is 0, 1, or 2; and wherein each $R^1$ is independently hydrogen, C1-C4 alkyl, $CH_2Ar^1$, or $Ar^1$; and wherein each $Ar^1$, when present, is aryl substituted with 0, 1, or 2 groups independently selected from halogen, —OH, —CN, —$N_3$, —$NH_2$, C1-C4 alkyl, C1-C4 alkoxy, C1-C4 monohaloalkyl, C1-C4 polyhaloalkyl, C1-C4 alkylamino, and C1-C4 dialkylamino Various articles can be prepared from the disclosed compositions. Thus, the articles prepared from the compositions will also have the polymer present in the article. Suitable articles include vessels and films, such as flexible sheet films, flexible bags, pouches, semi-rigid and rigid containers such as bottles (e.g., PET bottles) or metal cans, or combinations thereof.

Typical flexible films and bags include those used to package various food items and can be made up of one or a multiplicity of layers to form the overall film or bag-like packaging material. The composition of the present invention can be used in one, some or all of the layers of such packaging material.

Specific articles include preforms, containers and films for packaging of food, beverages, cosmetics, pharmaceuticals, and personal care products where a high oxygen barrier is needed. Examples of beverage containers are bottles for holding water and carbonated soft drinks, and the invention is particularly useful in bottle applications containing juices, sport drinks, beer or any other beverage where oxygen detrimentally affects the flavor, fragrance, performance (e.g., vitamin degradation), or color of the drink. The compositions are also particularly useful as a sheet for thermoforming into rigid packages and films for flexible structures. Rigid packages include food trays and lids. Examples of food tray applications include dual ovenable food trays, or cold storage food trays, both in the base container and in the lidding (whether a thermoformed lid or a film), where the freshness of the food contents can decay with the ingress of oxygen. The compositions can also be used in the manufacture of cosmetic containers and containers for pharmaceuticals or medical devices.

Other suitable articles include rigid or semi-rigid articles including plastic, such as those utilized for juices, soft drinks, as well as thermoformed trays or cup normally having thickness in the range of from 100 to 1000 micrometers. The walls of such articles can comprise single or multiple layers of materials. The article can also take the form of a bottle or can, or a crown, cap, crown or cap liner, plastisol or gasket. The composition of the present invention can be used as an integral layer or portion of, or as an external or internal coating or liner of, the formed semi-rigid or rigid packaging article. As a liner, the composition can be extruded as a film along with the rigid article itself, e.g., by coextrusion, extrusion coating, or an extrusion lamination process, so as to form the liner in situ during article production; or alternatively can be adhered by heat and/or pressure, by adhesive, or by any other suitable method.

Besides articles applicable for packaging food and beverage, articles for packaging other oxygen-sensitive products can also benefit from the present invention. Such products would include pharmaceuticals, oxygen sensitive medical products, corrodible metals or products, electronic devices and the like.

Oxygen permeability of an article can be maintained for a longer period of time by storing the article in a sealed container or under an inert atmosphere such as nitrogen prior to use with oxygen sensitive materials.

The articles can be made by various methods known in the art. Generally, the articles are prepared by melt processing methods (i.e., a melt of the composition). Such processes generally include injection molding, stretch blow molding, extrusion, thermoforming, extrusion blow molding, and (specifically for multilayer structures) coextrusion and lamination using adhesive tie layers. Orientation, e.g., by stretch blow molding, of the polymer can be used with polyethylene terephthalate and other phthalate polyesters because of the known mechanical advantages that result.

The melt processing zone for making the article can be operated under customary conditions effective for making the intended articles, such as preforms, bottles, trays, and other articles mentioned above. In one aspect, such conditions are effective to process the melt without substantially increasing the intrinsic viscosity of the melt and which are ineffective at promoting transesterification reactions. In some preferred aspects, suitable operating conditions effective to establish a physical blend of the base polymer, oxidizable organic component, and transition metal are temperatures in the melt processing zone within a range of about 250° C. to about 300° C. at a total cycle time of less than about 6 minutes, and typically without the application of vacuum and under a positive pressure ranging from about 0 psig (pound-force per square inch gauge) to about 900 psig. In some embodiments, the residence time of the melt on the screw can range from about 1 to about 4 minutes.

In a further aspect, the article is formed as a bottle or a film.

In a further aspect, the at least one residue has a structure represented by a formula selected from:

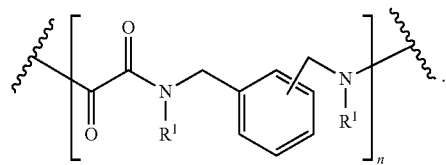

In a still further aspect, the at least one residue has a structure represented by a formula selected from:

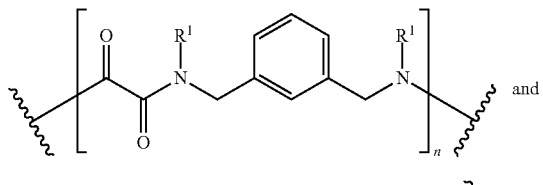

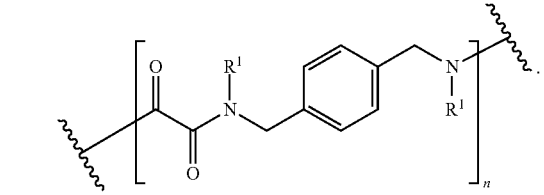

In yet a further aspect, the at least one residue has a structure represented by a formula selected from:

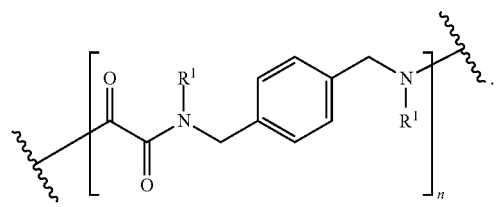

In a further aspect, the at least one residue has a structure represented by a formula selected from:

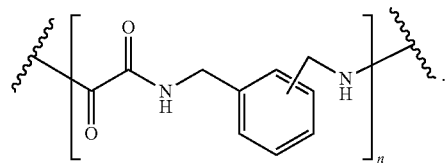

In a still further aspect, the at least one residue has a structure represented by a formula selected from:

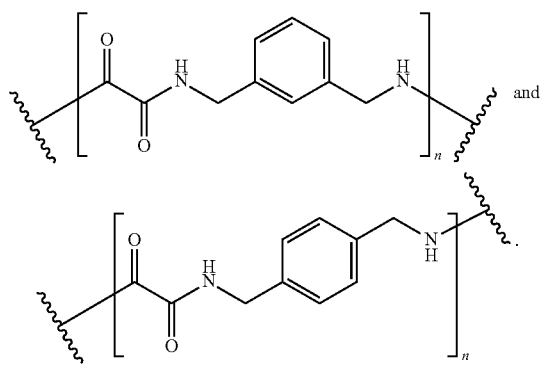

and

In yet a further aspect, the at least one residue has a structure represented by a formula selected from:

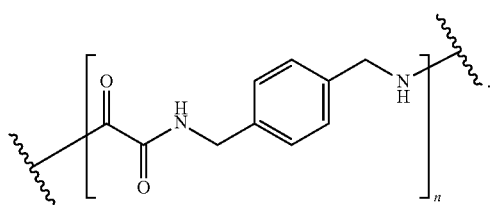

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An oxygen scavenging composition comprising:
   (a) a polyamide formed by the reaction of oxalic acid and/or oxalic halide with para-xylene diamine, wherein the oxalic acid and/or the oxalic halide, together with the para-xylene diamine comprise at least about 50% of the polyamide by mass, wherein the polyamide comprises at least one residue having a formula:

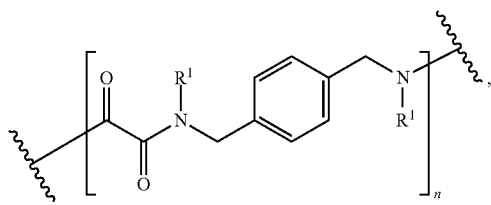

wherein n is greater than 5;
   wherein each $R^1$ is $CH_2Ar^1$ or $Ar^1$; and
   wherein each $Ar^1$ is aryl substituted with 0, 1, or 2 groups independently selected from halogen, —OH, —CN, —N$_3$, —NH$_2$, C1-C4 alkyl, C1-C4 alkoxy, C1-C4 monohaloalkyl, C1-C4 polyhaloalkyl, C1-C4 alkylamino, and C1-C4 dialkylamino;
   (b) polyethylene terephthalate; and
   (c) a transition metal in a positive oxidation state,
   wherein the composition does not contain a nucleating agent.

2. The composition of claim 1, wherein the polyamide has a molecular weight of at least about 10,000.

3. The composition of claim 1, wherein the polyamide is present in an amount of from about 0.5 wt % to about 10 wt % based on the weight of the composition.

4. The composition of claim 1, wherein the transition metal is cobalt.

5. The composition of claim 1, wherein the at least one residue is present in an amount of about 1 wt % to about 10 wt %, based on the weight of the composition.

6. The composition of claim 1, wherein cobalt is present in an amount of from about 10 ppm to about 400 ppm.

7. A method of making the composition of claim 1, the method comprising the step of mixing the polyamide, polyethylene terephthalate, and cobalt.

8. An article of manufacture comprising the composition of claim 1.

9. The composition of claim 1, wherein the composition consists of:
   (a) the polyamide;
   (b) polyethylene terephthalate; and
   (c) the transition metal.

10. The composition of claim 1, wherein each said $Ar^1$ is phenyl substituted with 0, 1, or 2 groups independently selected from halogen, —OH, —CN, —N$_3$, —NH$_2$, C1-C4 alkyl, C1-C4 alkoxy, C1-C4 monohaloalkyl, C1-C4 polyhaloalkyl, C1-C4 alkylamino, and C1-C4 dialkylamino.

11. The composition of claim 1, wherein each said $Ar^1$ is phenyl substituted with 0, 1 group independently selected from halogen, —OH, —CN, —N$_3$, —NH$_2$, C1-C4 alkyl, C1-C4 alkoxy, C1-C4 monohaloalkyl, C1-C4 polyhaloalkyl, C1-C4 alkylamino, and C1-C4 dialkylamino.

12. The composition of claim 1, wherein each said $Ar^1$ is phenyl monosubstituted with a group independently selected from halogen, —OH, —CN, —N$_3$, —NH$_2$, C1-C4 alkyl, C1-C4 alkoxy, C1-C4 monohaloalkyl, C1-C4 polyhaloalkyl, C1-C4 alkylamino, and C1-C4 dialkylamino.

13. The composition of claim 1, wherein each said $Ar^1$ is unsubstituted phenyl.

* * * * *